(12) United States Patent
Peiffer et al.

(10) Patent No.: US 6,388,018 B1
(45) Date of Patent: May 14, 2002

(54) GRAFT COPOLYMERS CONTAINING IONOMER UNITS

(75) Inventors: Dennis G. Peiffer, Annandale, NJ (US); Hsien-Chang Wang, Bellaire, TX (US); Pamela Jean Wright, Easton, PA (US); Joseph A. Sissano, Leonardo, NJ (US); Lewis J. Fetters, Annandale, NJ (US); Louise M. Wheeler, New Providence, NJ (US); Rebecca L. Rucker, Warren, NJ (US)

(73) Assignee: ExxonMobile Research and Engineering Company, Ananadale, NJ (US)

( * ) Notice: Subject to any disclaimer, the term of this patent is extended or adjusted under 35 U.S.C. 154(b) by 0 days.

(21) Appl. No.: 09/519,389

(22) Filed: Mar. 3, 2000

Related U.S. Application Data

(62) Division of application No. 08/862,630, filed on May 23, 1997, now Pat. No. 6,060,563.

(51) Int. Cl.$^7$ .................... C08F 257/02; C08F 259/02
(52) U.S. Cl. .................... 525/241; 525/213; 525/217; 525/195; 525/357
(58) Field of Search ................ 525/241, 213, 525/217, 195, 357

(56) References Cited

U.S. PATENT DOCUMENTS

| | | |
|---|---|---|
| 5,162,445 A | 11/1992 | Powers et al. |
| 5,294,678 A | 3/1994 | Tse et al. |
| 5,459,174 A | 10/1995 | Merrill et al. |

FOREIGN PATENT DOCUMENTS

| | | |
|---|---|---|
| WO | WO9104992 | 4/1991 |
| WO | WO9104995 | 4/1991 |
| WO | WO9107451 | 5/1991 |

OTHER PUBLICATIONS

Anionic Polymerization of Isoprene, Butadiene, and Styrene with 3–dimethylaminopropyllithium, S. Pispas, et al., Polymer 36, 15, 3005–3011, (1995).
Anionic Functional Initiators. 1:3 Dimethylaminopropyllithium as an Initiator for the Synthesis of Bi–and Difunctional Polybutadienes, M. J. Stewart, et al., British Polymer Journal 22, 4, 1990.
3–Dimethylaminiopropyl–Lithium–An Analytical and Kinetic Investigation of a New Initiator System for Polymer Synthesis, C.D. Eisenbach, et al., European Polymer Journal, vol. 11, p 699–704 (1975).

*Primary Examiner*—James J. Seidleck
*Assistant Examiner*—Olga Asinovsky
(74) *Attorney, Agent, or Firm*—Paul E. Purwin; Joseph C. Wang

(57) ABSTRACT

Graft copolymers having cationic units pendant to the backbone chain are disclosed. These polymers are prepared by reacting a polymer containing halogenated para-methylstyrene units in the chain, e.g., a brominated copolymer of isobutylene and para-methylstyrene, with an anionically polymerized polymer made using an organolithium initiator compound having the formula $R_1 R_2 Z R_3$—Li where $R_1$ and $R_2$ are alkyl radicals, $R_3$ is a direct link or an organic radical and Z is nitrogen or phosphorous. Reaction of the anionically polymerized polymer having an $R_1 R_2 Z R_3$— end group with the halogenated polymer leads to graft polymers coupled by a quaternary ammonium or phosphonium groups.

15 Claims, No Drawings

GRAFT COPOLYMERS CONTAINING IONOMER UNITS

This is a divisional of U.S. Ser. No. 08/862,630, filed May 23, 1997, now U.S. Pat. No. 6,060,563.

BACKGROUND OF THE INVENTION

1. Field of the Invention:

This invention relates to graft copolymers containing cationic groups in the polymer chain.

2. Description of the Related Art:

It is well known to blend low Tg (glass transition) elastomers with more brittle thermoplastic polymers having a higher Tg to yield blends with improved toughness and impact strength. The desired properties are only obtained by achieving a fine dispersion of the elastomer in the thermoplastic polymer.

It is also well known to form blends of relatively highly unsaturated elastomers such as polybutadiene or natural rubber with elastomers having less or no ethylenic unsaturation, e.g., butyl rubber, halogenated butyl rubber, copolymers of isobutylene and a para-alkylstyrene, ethylene/propylene or ethylene/propylene/diene rubber and the like, in order to enhance the properties of vulcanizates based on such blends. Such property enhancement includes improved oil and grease resistance, improved resistance to oxygen and ozone degradation, improved abrasion resistance and improved impermeability to air, water vapor and many organic solvents.

One of the major problems associated with the formation of such blends is that most of these polymer components are mutually incompatible. Poor mutual adhesion at the blend phase boundaries in such systems results in a diminishment of physical properties of the polymer blend.

It is well established that the use of appropriately structured polymer compatibilizers as additives in such systems can markedly enhance physical properties. These additives are typically block or graft copolymers in which polymer segments interact in a favorable manner with each polymer phase of the blend. This "bridging" at the interfacial blend region enhances the interfacial adhesion, and improves the dispersion and size of the discrete blend phase and improves mechanical properties. Thus, for example, a block or graft copolymer containing both polybutadiene and polystyrene polymer units can serve as a compatibilizer in a polymer system comprising a blend of polystyrene and polybutadiene.

Analogs of halogenated butyl rubber have been recently discovered which comprise the halogenated product of a random copolymer of a $C_4$ to $C_7$ isomonoolefin, e.g. isobutylene, and a para-alkystyrene, e.g. para-methylstyrene, such as disclosed in U.S. Pat. No. 5,162,445. Although these materials are devoid of olefinic backbone unsaturation, the presence of a benzylic halogen, e.g. bromine, permits facile crosslinking or curing of the polymers using, for example, zinc oxide/stearic acid curing systems. In addition, functionalized versions of these copolymers may be prepared by nucleophilic substitution of the benzylic halogen present in the polymer molecules with a reagent reactive therewith to provide polymers containing amine, acid, ester, amide, onium and the like functionality. Grafted polymers may also be prepared by a graft-onto reaction wherein the halogenated copolymer is reacted in solution with a polymeric nucleophile such as polystyryl lithium. These graft-onto reactions lead to the production of solvent soluble grafted copolymers which are disclosed to be useful as compatibilizers for polymer blends, e.g., blends of polyisobutylene, butyl rubber or halogenated copolymers of isobutylene and para-methylstyrene with polystyrene.

SUMMARY OF THE INVENTION

The present invention provides graft copolymers which are polymeric onium salts of polymers and copolymers containing halogenated para-alkylstyrene units in the backbone polymer chain.

More specifically, the invention provides a graft copolymer containing cationic units in the polymer chain having the structure:

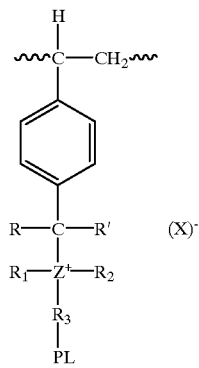

wherein R and R' are independently selected from the group consisting of hydrogen and; a $C_1$ to $C_4$ alkyl group, Z is selected from the group consisting of nitrogen and phosphorous, $R_1$ and $R_2$ are the same or different alkyl radicals containing 1 to 4 carbon atoms, $R_3$ is a direct link or an organic radical containing 1 to 6 carbon atoms, X is halogen and PL is a polymer chain segment derived from at least one anionically polymerized monomer.

The invention also provides a process for preparing a graft copolymer comprising:

a) polymerizing one or a mixture of anionically polymerizable monomers under anionic polymerization conditions using, as a polymerization initiator, a compound having the formula $R_1$ $R_2$ Z $R_3$—Li to form a polymer having the structure $R_1$ $R_2$ Z $R_3$—PL; and b) reacting said polymer under onium salt-forming conditions with a copolymer containing polymerized monomer units in the polymer chain having the structure:

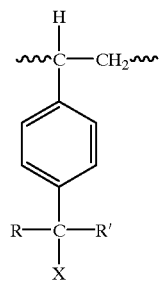

wherein a graft copolymer containing cationic units pendant to the backbone polymer chain and having the structure described above is obtained.

Graft copolymers of this invention are useful as compatibilizers for immiscible polymer blends and are also useful in their own right as thermoplastic elastomers having improved mechanical properties.

DETAILED DESCRIPTION OF THE INVENTION

The graft copolymers within the scope of this invention differ from the graft copolymers disclosed in U.S. Pat. No. 5,162,445 in their structure and method of preparation. In the '445 patent, a "living" anionically polymerized polymer or a carboxylate thereof is subjected to a nucleophilic displacement reaction involving benzylic halogen present in a backbone polymer containing polymerized, halogenated para-methylstyrene. In the present invention, graft copolymers are prepared by reacting an anionically polymerized polymer polymerized using a tertiary amino or phosphino lithium initiator. Subsequent reaction of the phosphino or amino group present at the polymer end with a backbone polymer containing the benzylic halogen results in the formation of an ammonium or phosphonium cationic group situated between the backbone chain and the pendant graft polymer. This group enhances both the mechanical properties of the graft copolymer as well as the dispersion therein of a negatively charged filler materials such as carbon black and colloidal silica.

Polymers which may be used as the backbone segment in preparing the graft copolymers of this invention may be thermoplastic or elastomeric polymers. Suitable thermoplastic polymers include halogenated, e.g., brominated, poly (para-methylstyrene) and random copolymers of halogenated para-methylstyrene with one or more other monomers such as non-halogenated para-methylstyrene, styrene, t-butylstyrene, alpha-methylstyrene, acrylonitrile, alkylacrylates or methacrylates, butadiene and the like.

Suitable elastomeric copolymers used as the backbone segment include random halogenated copolymers of less than 50 wt % of a para-alkylstyrene such as para-methylstyrene and at least 50 wt % of one or more elastomer-forming monomers such as $C_4$ to $C_7$ isomonoolefin, butadiene, isoprene and the like.

Preferred copolymers forming the backbone segment of the graft copolymers are the halogenation product of random elastomeric copolymers of a $C_4$ to $C_7$ isomonoolefin, such as isobutylene, and a para-alkyl styrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

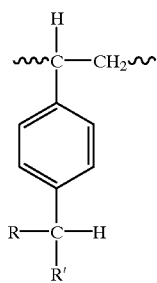

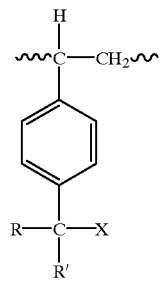

wherein R and R' are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. Up to about 65 mole % of the para-alkylstyrene present in the interpolymer structure may be the halogenated structure (2) above, more preferably from about 5 to 60 mol %.

Most useful of such materials are elastomeric random copolymers of isobutylene and para-methylstyrene containing from about 0.5 to about 20 wt % para-methylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a narrow molecular weight distribution (Mw/Mn) of less than about 7, more preferably less than about 5.0, a preferred viscosity average molecular weight in the range of from about 300,000 up to about 2,000,000, and a preferred number average molecular weight in the range of from about 10,000, preferably 25,000, to about 1,000,000, as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.01 to about 10 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference. Graft polymer derivatives from these copolymers are particularly disclosed in Examples 96–106.

The graft polymer (PL) segments of the graft copolymers of this invention are derived from one or a mixture of anionically polymerizable monomers such as butadiene, isoprene, vinyl aromatic monomers such as styrene, t-butyl styrene, alpha-methylstyrene and the like; alkyl acrylates and methacrylates, acrylonitrile and like anionically polymerizable monomers. The graft PL segments may be thermoplastic (Tg above 20° C.) or elastomeric (Tg below 20° C.) in nature. The graft PL segments may be homopolymer segments or copolymer segments, including random copolymers or block copolymers. The block copolymer segments may comprise diblock (AB) or polyblock (ABA, ABAB, etc.) segments, as well as tapered block segments. The molecular weight of these graft PL segments generally may range from about 1,000 to 100,000 g/mole.

Nucleophilic initiators which may be used in the anionic polymerization of the graft PL segments in accordance with this invention include tertiary amino or phosphino lithium compounds having the structure: $R_1 R_2 Z R_3$—Li, wherein Z is nitrogen or phosphorous, $R_1$ and $R_2$ are the same or different alkyl radicals containing 1 to 4 carbon atoms and $R_3$ is a direct link or an organic radical containing 1 to 6 carbon atoms, preferably a hydrocarbon radical containing 1 to 4 carbon atoms. The most preferred initiators are tertiary amino lithium compounds having the structure:

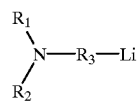

wherein $R_1$ and $R_2$ are alkyl radicals containing 1-3 carbon atoms and $R_3$ is a hydrocarbon group containing 2-4 carbon atoms, and tertiary phosphino lithium compounds having the structure:

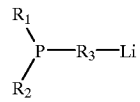

wherein $R_1$ and $R_2$ are alkyl radicals containing 1–3 carbon atoms and $R_3$ is a hydrocarbon group containing 2–4 carbon atoms.

Suitable initiator compounds include 3-dimethylaminopropyl-lithium, 3-diethylaminopropyl-lithium, diethyl amino-lithium, diethylphosphino-lithium, 3-dimethyl-phosphinopropyl-lithium, 3-dimethylaminobutyl-lithium and like compounds.

A particularly preferred initiator is a tertiary amino lithium compound wherein $R_1$ and $R_2$ are each methyl and $R_3$ is propyl, e.g., 3-dimethylaminopropyl-lithium. This initiator, its method of preparation and its use for preparing diolefin and styrene polymers is disclosed in Eisenbach et al, Eur. Polym J. (1975), 11(10), p. 699–704; Stewart et al, Br Polym J. (1990), 22(4), p. 319–325; and Pispas et al, Polymer (1995) 36(15) p 3005–11. This initiator demonstrates a high initiation efficiency and a fast propagation rate of the growing PL polymer chain.

In accordance with the present invention, it has been found that the tertiary amino or phosphino atoms of these initiators are also quite reactive under onium salt-forming conditions with benzylic halogen present in the backbone polymer chain such that the quaternary ammonium or phosphonium polymer salt is readily formed.

Anionic polymerization to form the graftable PL segments is carried out under well known anionic solution polymerization techniques such as disclosed in U.S. Pat. No. 5,162,445. These polymerizations are normally carried out at low temperatures under vacuum or in an inert atmosphere with rigorously purified and dried reagents and cleaned reactor-ware, since trace moisture or impurities can lead to premature termination of the reaction. The reaction is conducted in an organic solvent which solvates the initiator and monomer reactants. Suitable solvents include benzene, toluene, hexane, tetrahydrofuran, 1,2-dimethyoxyethane and like solvents.

The anionic polymerization is initiated by contacting the organolithium initiator with one or a mixture of anionically polymerizable monomers to form a propagating, living polymer chain. Block copolymer segments may be formed by first contacting the initiator with monomer A to form living pA.Li carbocation segments, followed by contact of these living pA.Li carbocation segments with monomer B to form pApB (AB) block copolymers. Tri (ABA) and other poly block segments may be formed by sequential addition of other monomers following the above described polymerization methodology.

The anionic polymerization may be terminated by the addition to the polymer carbocation of a proton donor, chain transfer agent such as water or a lower alcohol, e.g. isopropyl alcohol. The resulting polymer will comprise a polymer PL having the functional tertiary amino or phosphino group positioned at a single chain end according to the structure $R_1 R_2 Z R_3$—PL wherein $R_1$, $R_2$, Z and $R_3$ are as described above.

The graft reaction may be accomplished by heating a solution of the halogenated backbone polymer and the functionalized grafting PL polymer to reflux in a suitable organic solvent and under nitrogen for a period of time sufficient to allow the grafting reaction to take place as determined by GPC, generally from about 1 to 24 hours. The graft copolymer may then be recovered from solution by precipitation using an excess of nonsolvent such as an alcohol, e.g. isopropanol, followed by vacuum drying. The graft copolymers may also be produced directly by mixing in the melt state. This is a solventless procedure and is the preferred route for economic reasons. Typical melt mixers include bbanbury mixers, Brabender melt mixers, extruders and other such mixers known in the art.

The degree of grafting (grafting level) of the PL polymer segments is controlled largely as a function of the number of benzylic halogen atoms present in the backbone chain with which the functionalized PL segments may react and the quantity of functionalized PL segments contacted with the halogenated backbone polymer. In general, the graft copolymer may comprise from about 1 to about 70 wt % of the graft PL segments, more preferably from about 10 to 50 wt % of the graft PL segments.

The properties of the graft copolymers and their blend compatibilization efficiency is dependent on the average number of grafts per chain, molecular weight of the graft segments and the polymer structure of the grafts themselves. The latter two parameters are controlled by the anionic polymerization procedure itself. The former parameter can be controlled by the level of benzylic halide groups and the concentration of amino or phosphino functionalized polymers used in the grafting process. The concentration of amino or phosophino terminated polymers may also be controlled by "diluting" the reactive polymer with non-reactive polymer, either added prior to the graft reaction or formed in-situ such as by conducting the anionic polymerization using a mixture of the amine or phosphine functional initiator and a conventional organo lithium initiator, such as sec-butyl lithium, which produces polymer segments non-reactive with the backbone polymer once the anionic polymerization is terminated.

The graft polymer (PL) segments may also comprise a mixture of separately polymerized different polymer segments. For example, reactive polystyrene and reactive polybutadiene polymer chains can be mixed in any proportion prior to contact with the backbone polymer for the grafting reaction to produce both polystyrene and polybutadiene graft segments pendant to the backbone polymer chain.

Graft copolymers comprising a isobutylene polymer backbone chain and a polystyrene graft chain can be used to compatibilize blends comprising isobutylene polymers, including butyl rubber and/or isobutylene/para-methylstyrene rubber, with polystyrene or styrene-containing copolymers. Similarly, graft copolymers containing a isobutylene polymer backbone chain and polybutadiene and/or polyisoprene graft chains will compatibilize blends of isobutylene polymers with polybutadiene and/or polyisoprene.

Also, in the production of pneumatic tires, a number of elastomeric products come in contact with each other in the course of tire assembly. Typically, the adhesion between these materials is poor. This adhesion can be improved using the graft copolymers of this invention either as adhesion layers between butyl and more highly unsaturated elastomer layers or by fabricating one or more tire assembly layers from compositions containing these graft polymers.

Further, these graft copolymers can be used as thermoplastic elastomers if the grafts have a glass transition temperature (Tg) typically above room temperature, e.g. graft copolymers containing styrene, para-methylstyrene, t-butylstyrene, acrylates, methacrylates and the like. Unique elastomeric-elastomeric "thermoplastic" elastomers can also be produced when the grafts have a Tg less than room temperature. Especially unique thermoplastic elastomers are formed when the grafts are of a blocky structure with one or more components of the block possessing a Tg greater than room temperature.

Typical tire applications where these materials are useful include sidewall of tires as well as treads, bladders, innerliners and carcasses. Typical nontire applications include thermoplastic elastomers, mechanical goods, hoses, belting and adhesives, among other uses.

The following examples are illustrative of the invention. The brominated poly (isobutylene-co-4-methylstyrene) polymer (BR-IPMS) used in the examples has a saturated copolymer backbone chain with randomly distributed pendant para-methyl substituted aromatic rings. After polymerization, a solution bromination process is used in which a portion of the para-methyl groups is converted to bromomethyl groups to provide the desired benzyl bromide functionality.

The BR-IPMS elastomer used in the examples has a viscosity average molecular weight of 350,000 g/mole, determined in diisobutylene at 20° C., and a Mooney viscosity of 35 (ML 1+8 at 125° C.). It contains 1.14 wt % benzyl bromide, as determined by x-ray fluorescence. The benzyl bromide content is measured by FTIR using a master curve calibrated by NMR results.

This BR-IPMS copolymer may be purified for use in the graft reactions by dissolving it in hexane or cyclohexane at a 10 wt % solids content. When fully dissolved, the polymer is precipitated in acetone or methyl ethyl ketone. Redissolve the "wet" polymer again in THF at about 10% solids ratio. When fully dissolved, place the slightly cloudy cement solution into suitable sized centrifuge tubes and centrifuge at the highest allowable speed for 40 minutes. When the centrifuge stops, carefully remove the tubes and decant off the precipitate at the bottom of the tube. Precipitate the clear cement with acetone. Place the polymer in a vacuum oven and dry at +70° C. until the slightly white precipitate turns into a clear transparent polymer slab. The polymer is now ready for grafting reactions as set forth in Examples 5–7.

Examples 1–4 illustrate the preparation of anionically polymerized polymers which are used in the grafting reactions.

EXAMPLE 1
(Polyisoprene)

A shank type reaction flask (500 mL) equipped with a Teflon valve stem for closing, a Teflon stir bar and an 18/9 ball joint side arm is set up so the flask can be attached to the vacuum rack. The flask was oven dried overnight, cooled under nitrogen and brought into the glove box where it was degassed for 20 minutes, then returned to be flushed with argon.

The inside of the reaction flask was rinsed with 5 mL of the initiator solution to clean out any remaining contaminants, then rinsed 5 times with freshly dried and distilled hexane. The reaction flask is now considered "dry".

Charged into the reaction flask is $17.52 \times 10^{-4}$ moles of 3-dimethyl amino propyllithium (product of Lithco) using an oven dried pipette. Replace the Teflon valve stem and seal the reactor. Subsequently, move the reaction flask to a vacuum rack and attach the flask using the 18/9 male side arm. Degas the side arm and submerge the reactor into a liquid nitrogen bath. When the initiator solution is totally frozen, the main valve of the flask is opened and the contents of the flask degassed to 10 microns.

The solvent (hexane) is dried over t-butyllithium with styrene to give color to the solvent which indicates the presence of polystyryllithium anions, thereby indicating the solvent is "bone dry". The solvent flask is then frozen in liquid $N_2$ and degassed to 10 microns. The flask is then sealed and the flask allowed to warm to room temperature.

With the reaction flask degassed to 10 microns and submerged in the liquid $N_2$, the desired amount of solvent (200 mL) is vacuum distilled off the polystyryllithium solution and into the reaction flask. The reaction flask is again sealed, allowed to freeze and solid degassed again to 10 microns, and then sealed.

Isoprene monomer (Aldrich) is placed in a shank type flask (50 mL) equipped with a Teflon stir bar, Teflon valve stem and an 18/9 male ball joint side arm (same type flask as the reactor flask, but smaller). The flask is blanketed with $N_2$ and sealed. The flask is then brought into the glove box where 3 mL of triethyl aluminum is added to the flask containing the isoprene by removing the valve stem. The isoprene solution containing the triethyl aluminum is then sealed in the flask by replacing the valve stem and brought out of the glove box and attached to the vacuum rack. The side arm is degassed to 10 microns. The isoprene solution is stirred for 45 min. over the TEA. The flask is then frozen in liquid $N_2$ and the contents of the flask degassed to 10 microns. The flask is again sealed and allowed to warm to room temperature.

The reaction flask, which is still frozen and at 10 microns pressure, is opened to the system and the isoprene is distilled over slowly into the reaction flask. Once the isoprene is distilled off the triethyl aluminum, the reaction flask is again sealed, frozen solid with liquid nitrogen, again degassed to 10 microns and sealed.

The reaction flask is then allowed to warm to room temperature and stirred overnight.

The reaction is terminated by distilling over degassed isopropyl alcohol.

The terminated cement product was stabilized with a 2% benzohydroquinone (BHT) stabilizer, concentrated on a Buchi Rotovap and precipitated in isopropyl alcohol. The polymer was then dried in a vacuum oven at +70° C. until a constant weight was obtained.

EXAMPLE 2
(Polybutadiene)

For the polybutadiene synthesis, the same procedure as described in Example 1 above is used with the exception of the drying of the butadiene monomer. Butadiene (Matheson Research grade) was condensed over 5 cc of 1.6 M N-butyllithium at −78° C. The condensed monomer was stirred for 30 minutes at −78° C., then degassed to 300 microns. The monomer was then vacuum distilled into the reaction flask, frozen to liquid $N_2$ temperature and degassed to 15 microns. The flask was sealed and allowed to warm to +40° C. overnight.

The cement product was chemically terminated by contact with degassed isopropyl alcohol, stabilized with 2% BHT and concentrated on Rotovap. Subsequently, the product was precipitated in isopropyl alcohol. As described previously, the polymer was dried in a vacuum oven at +70° C. until a constant weight was obtained.

EXAMPLE 3
(Styrene/Butadiene Block Copolymer)

The same procedure as described in Example 1 above was used to produce the styrene-butadiene block copolymer with the exception of the drying of the styrene monomer. The desired amount of styrene monomer was added to a 50 cc Schank tube equipped with a Teflon stir bar, Teflon valve stem and 18/9 male ball joint side arm. A nitrogen blanket was then placed over the monomer and the valve reinstalled and closed. The flask was placed in the glove box where 3 mL of triethyl aluminum (Aldrich) was added to the styrene monomer. The valve was reinstalled and sealed. The flask is re-attached to the vacuum rack and degassed to 15 microns. The styrene/TEA is stirred for 45 minutes to remove moisture from the styrene monomer. After 45 minutes, styrene is frozen with liquid $N_2$, degassed to 15 microns, sealed the flask and allowed to warm to room temperature. The reaction flask was submerged in liquid $N_2$, filled with the initiator and solvent, and was then opened. The styrene flask was then slowly opened. The styrene monomer was gradually distilled over into the reaction flask. After all the styrene was transferred, the reaction flask is sealed, allowed to cool to liquid $N_2$ temperature, then degassed to 15 microns. The flask is then allowed to warm to +50° C. An orange red color appears in the reaction flask indicating the propagation of the polystyrene species. To add the second block (polybutadiene) the polystyrene flask was re-frozen in liquid $N_2$ and degassed to 15 microns.

Butadiene (Matheson Research grade) was condensed over 5 cc of 1.6 M n-butyllithium at −78° C. The condensed monomer is stirred for 30 min at −78° C. then degassed to 300 microns. It was then vacuum distilled into the reaction flask, frozen to liquid $N_2$ temperature and degassed to 15 microns. The flask was sealed and allowed to warm to +40° C. overnight.

The diblock product was terminated with degassed isopropyl alcohol and stabilized with 2% BHT. The product was precipitated in isopropyl alcohol and dried in the vacuum oven at +70° C.

EXAMPLE 4
(Polystyrene)

The polystyrene synthesis was carried out by the process of Example 1 using styrene monomer instead of isoprene monomer. The styrene monomer was dried the same way as the styrene monomer used in Example 3.

Examples 5–7 illustrate the preparation of graft copolymers by reacting the purified BR-IPMS polymer and some of the amino-functionalized polymers prepared as above.

EXAMPLE 5
(BR-IPMS/Graft Polyisoprene)

Dissolve in a four neck flask equipped with an air driven stirrer, thermometer and nitrogen gas feed, 20 g of purified BR-IPMS copolymer (containing 1.14 wt % benzylic bromide groups) into 200 mls of heptane. Subsequently, dissolve 8.5 g amino-terminated polyisoprene (synthesized in Example 1) into 85 mls of heptane in a separate flask and add the BR-IPMS/heptane solution. Add sufficient amount of isopropanol to bring the alcohol content to 5 wt %. Begin heating to reflux temperature for about 12 hours while degassing with a steady flow of nitrogen gas. The solution is then cooled to room temperature and the graft copolymer is isolated with the addition of a large excess of isopropanol containing 0.2 wt % BHT. The product was dried in a vacuum oven at 50° C. for 12 hours. The product may then be stored in a freezer if desired.

EXAMPLE 6
(BR-IPMS/Graft Polystyrene)

The polystyrene graft copolymer was prepared using the polystyrene prepared in Example 4 by the process of Example 5, except that toluene solvent was used instead of heptane.

EXAMPLE 7
(BR-IPMS/Graft Styrene-Butadiene Block Copolymer)

This graft copolymer was prepared using the styrene/butadiene block copolymer prepared in Example 3 by the process of Example 5, except that toluene solvent was used instead of heptane.

The graft copolymer materials prepared in Examples 5–7 were each analyzed by nuclear magnetic resonance (NMR), gel permeation chromatography (GPC) and transmission electron microscopy (TEM). In addition, films were prepared via conventional compression molding techniques.

Typically, the graft copolymer crumb were formed into final form through compression molding into approximately 2"×2"×0.002" pads using the following conditions: 4 minutes preheat at 160° C., followed by a 2 minute press cycle at 1.5 tons (160° C.) and finally a 3 minute cooling to room temperature, again under 1.5 tons pressure.

Stress-strain properties were tested at room temperature with an Instron Tensile tester Model 1122. Samples used were microdumbbells which were cut with a die from compression-molded pads. A crosshead speed of 0.02 in/min was used in all the tensile measurements.

The grafting level for each of the three graft copolymers prepared in Examples 5–7 was about 30 wt %.

Typical mechanical property data of the three graft copolymers compared with BR-IPMS alone and a physical blend of 70 wt % BR-IPMS and 30 wt % polystyrene (PS) are shown in Table 1. The data clearly shows an improvement in tensile properties of the graft copolymers compared with BR-IPMS alone or the physical blend of polymer components.

TABLE 1

| MATERIAL | MODULUS (psi) | TENSILE STRENGTH (psi) | ELONGATION AT BREAK (%) |
|---|---|---|---|
| BR-IPMS | 92 | 24 | 1440 |
| BR-IPMS/-g-PI (Example 5) | 74 | 285 | 920 |
| BR-IPMS/-g-PS (Example 6) | 1730 | 2060 | 190 |
| BR-IPMS/g(PS-b-PB) (Example 7) | 182 | 265 | 1480 |
| BR-IPMS/PS (Physical Blend) | 680 | 70 | 1900 |

What is claimed is:

1. A process for preparing a graft copolymer containing cationic moieties and having the structural formula:

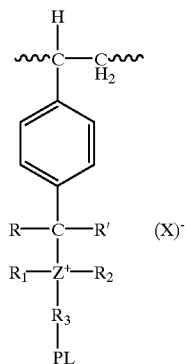

wherein R and R' are independently selected from the group consisting of hydrogen and a $C_1$ to $C_4$ alkyl group, Z is selected from the group consisting of nitrogen and phosphorous, $R_1$ and $R_2$ are the same or different alkyl radicals containing 1 to 4 carbon atoms, $R_3$ is a direct link or an organic radical containing 1 to 6 carbon atoms, X is a halogen, and PL is a polymer chain segment derived from at least one anionically polymerized monomer, the process comprising the steps of:
   a) polymerizing one or a mixture of anionically polymerizable monomers under anionic polymerization conditions using, as a polymerizaton initiator, a compound having the formula $R_1R_2ZR_3$—Li to form a polymer having the structure $R_1R_2Z$ $R_3$—PL, wherein $R_1$, $R_2$, Z, $R_3$ and PL are as previously defined; and
   b) reacting said polymer under onium salt-forming conditions with a copolymer containing polymerized monomer units in the polymer chain having the structure:

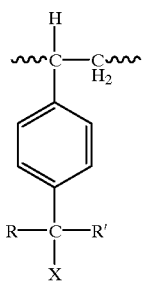

wherein R and R' are as previously defined.

2. The process of claim 1 wherein X is bromine.
3. The process of claim 2 wherein Z is nitrogen.
4. The process of claim 1 wherein R and $R^1$ are each hydrogen.
5. The process of claim 1 wherein $R_3$ is an organic radical containing 1 to 6 carbon atoms.
6. The process of claim 1 wherein said backbone polymer comprises a polymer of a $C_4$ to $C_7$ isomonoolefin.
7. The process of claim 6 wherein said backbone polymer is an elastomeric polymer containing at least about 80 wt % of polymerized isobutylene.
8. The process of claim 7 wherein said backbone polymer further contains at least 0.5 wt % of polymerized para-methylstyrene or a halogenated para-methylstyrene.
9. The process of claim 1 wherein PL is a polymer segment derived from a monomer selected from one or a mixture of diolefins, vinyl aromatic monomers, acrylonitrile and alkyl acrylates or methacrylates.
10. The process of claim 1 wherein PL is a polymer segment having an average molecular weight of at least about 1000 g/mole.
11. The process of claim 10 wherein PL is polybutadiene.
12. The process of claim 10 wherein PL is polyisoprene.
13. The process of claim 10 wherein PL is polystyrene.
14. The process of claim 10 wherein PL is a block copolymer of styrene and butadiene.
15. The process of claim 1 wherein Z is nitrogen, R and R' are each hydrogen, $R_1$ and $R_2$ are each methyl, and $R_3$ is propyl.

* * * * *